June 5, 1956        J. C. KANE        2,749,159

POSITIVE-LOCK TAKE-UP STUD

Filed Nov. 29, 1951

INVENTOR.
JOHN C. KANE
BY
ATTORNEY

United States Patent Office 2,749,159
Patented June 5, 1956

2,749,159
POSITIVE-LOCK TAKE-UP STUD

John C. Kane, Atlanta, Ga.

Application November 29, 1951, Serial No. 258,951

4 Claims. (Cl. 287—75)

My invention relates to a take-up stud, and more specifically to a take-up stud having a positive lock feature.

In the past, the problem has presented itself, in the textile industry and in many other industries, of obtaining a take-up stud having a positive adjustment which will allow minute and accurate increments of length of the stud to be changed quickly and efficiently. Accordingly, it is an object of my invention to provide a take-up stud incorporating the feature mentioned above.

It is a further object of my invention to provide a take-up stud which will allow certain and predetermined adjustments in its length to be made.

It is a further object of my invention to provide a take-up stud which contains an adjustment section which may be positioned at the most convenient section between the terminal ends thereof, with this adjustment section being easily re-located when desired.

It is a further object of my invention to provide a take-up stud which is adaptable to use in small places.

It is a further object of the invention to provide a take-up stud which when once adjusted will not be affected by vibrations of the machinery attached to its terminal ends.

It is a further object of my invention to provide a take-up stud which is simple in construction, inexpensive to manufacture and durable in structure.

Other and further objects and advantages of my invention will become apparent from the following disclosure when taken in conjunction with the accompanying drawings wherein like characters of reference designate corresponding parts throughout the several views, and wherein.

Figure 1:
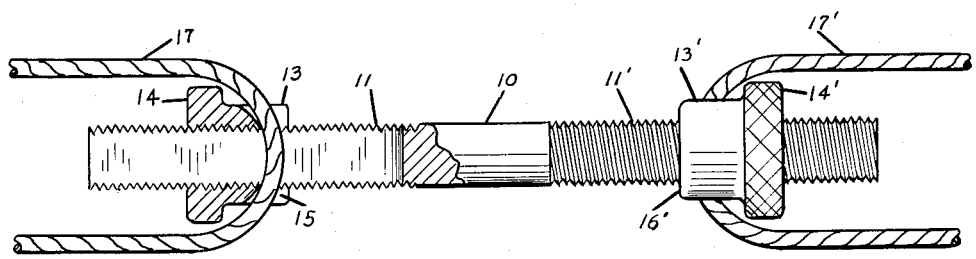
Fig. 1 is a side elevation showing the parts in locked relationship and having a broken cross-sectional view of one end.

Referring now in detail to the embodiment chosen for purpose of illustration, numeral 10 denotes a stud or shaft whose end portions 11 and 11' are separately threaded for a substantial distance, thus providing a small center portion with no threads, as seen in Fig. 1. Of course, it is immaterial whether the end portions are provided with right hand threads or left hand threads, or a combination of both; however, it would be less expensive to provide similar threads on both end portions.

Figure 2:
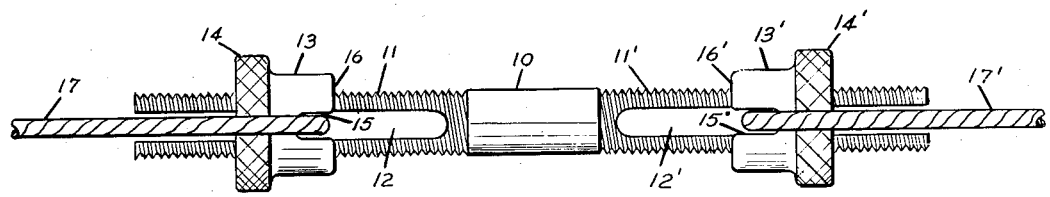
Fig. 2 is a top view of the embodiment shown in Fig. 1.

As shown in Fig. 2, end portions 11 and 11' are provided with axial slots 12 and 12' which are cut longitudinally through these threaded portions, giving a hairpin-shaped appearance to end portions 11 and 11'.

Figure 3:
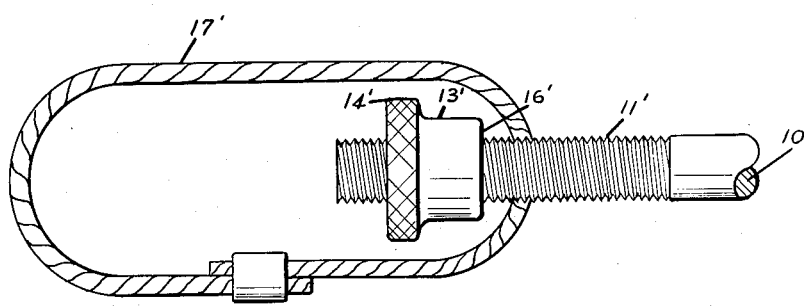
Fig. 3 is a fragmentary view of a detail.

Nuts 13 and 13' threadably engage end portions 11 and 11', respectively, and these nuts are provided with knurled heads 14 and 14' at their outermost portion. Transverse grooves 15 and 15' are made respectively along the bases 16 and 16' of nuts 13 and 13' so that when the nuts are positioned on their respective end portions and rotated to the proper position, these grooves coincide with slots 12 and 12' to provide a channel through which cables or fastening means 17 and 17' may be respectively positioned. As illustrated in Fig. 3, the respective ends of the respective fastening means are joined in any convenient manner to form closed loops adapted to engage the members to be coupled and also adapted, when engaging the nut, to slide into the channel, thus locking that nut in relation to the stud. It is to be remembered that fastening means 17 and 17' are of such size and rigidity that they will not only slide in slots 12 and 12' to lock and unlock the nuts, but also serve to prevent the threaded end portions from closing together accidentally and to block the tendency of threaded end portions 11 and 11' to be forced inward as pressure is applied against nuts 13 and 13'. It is further to be remembered that fastening means 17 and 17' do not necessarily have to be joined at their terminal ends as illustrated. If it is desired, the fastening means may be made from rigid material such that a hook-shaped member may be made with the hook thereof extending through and slidably fixed in the slot and the other end extending to engage one of the members to be joined. Fig. 3 illustrates one end of the stud in the unlocked position; while in this position nut 13' may be rotated to lengthen or shorten the effective length of the stud. When groove 15' is aligned with slot 12' that end of the stud may be locked by sliding fastening means 17' to engage the nut and slide into the aligned groove, as would normally be accomplished by applying tension to the free loops of fastening means 17 and 17'. The other end of the stud operates similarly.

If it is desired to decrease the effective length of the take-up stud, the fastening means adjacent the nut to be rotated should be slackened, thus removing the fastening means from the groove, and the nut rotated in 180 degree increments. Tension may again be applied to the stud as soon as the groove and slot are again aligned. It is to be remembered that the pitch of the threaded end portions will determine what increment of length of the take-up stud is changed; for example, if there are twelve threads to one inch, each 180 degree rotation of the nut will reduce or increase the effective length of the stud by one twenty-fourth of an inch.

It is obvious that my take-up studs may be provided with only one nut and threaded end assembly as seen in Fig. 3 without departing from the scope of my invention. Also, it is obvious that the nuts may threadably engage the stud inside their respective slots.

From the foregoing description of my invention, it is apparent that the free loops or terminal ends of fastening means 17 and 17' are attached to the members to be coupled, then the nuts are adjusted and tension applied. Further, it is also apparent that by providing a longer fastening means at one end of the stud than the other, the adjustment section, that is, the stud and nut assembly may be positioned at any convenient point between the members to be coupled.

It will be obvious to those skilled in the art that many variations may be made in the embodiment chosen for illustration without departing from the scope of my invention as defined by the following claims.

I claim:

1. A take-up device comprising a shaft having end portions provided with axial slots in said end portions, nuts having transverse notches disposed at the end of each nut farthest from the ends of the shaft to provide closed apertures in conjunction with the slots in said shaft, said nuts being adjustable on said shaft and rotatably engageable with said shaft to respectively encompass a portion of said slots, connecting members passing respectively through said slots and adapted to engage and be held in the notches of said nuts to prevent rotation thereof with respect to said shaft when tension is applied outwardly on said members.

2. The structure defined in claim 1 wherein said members are cord-like members.

3. The structure defined in claim 1 wherein said nuts are threadably on said shaft.

4. The structure defined in claim 1 wherein said members are cord-like members and said nuts are threadably on said shaft.

References Cited in the file of this patent

UNITED STATES PATENTS

| | | |
|---|---|---|
| 254,473 | Gates | Mar. 7, 1882 |
| 647,346 | Welch et al. | Apr. 10, 1900 |
| 877,774 | Holts | Jan. 28, 1908 |
| 1,012,328 | Cope | Dec. 19, 1911 |
| 1,305,591 | Dickson | June 3, 1919 |
| 1,368,480 | Brown | Feb. 15, 1921 |
| 1,423,235 | McArthur | July 18, 1922 |
| 2,137,834 | Dibner | Nov. 22, 1938 |
| 2,165,478 | Gross | July 11, 1939 |
| 2,278,320 | Kath | Mar. 31, 1942 |
| 2,354,474 | Noble et al. | July 25, 1944 |

FOREIGN PATENTS

| | | |
|---|---|---|
| 13,162 | Great Britain | June 1, 1911 |
| 12,791 | France | Sept. 6, 1910 |
| | (Addition to No. 415,460) | |
| 599,610 | Germany | July 6, 1934 |
| 726,367 | Germany | Oct. 12, 1942 |